Jan. 15, 1929.
B. J. MUMM ET AL
1,699,076
SAUSAGE CASING AND PROCESS OF PRODUCING THE SAME
Filed Oct. 15, 1927
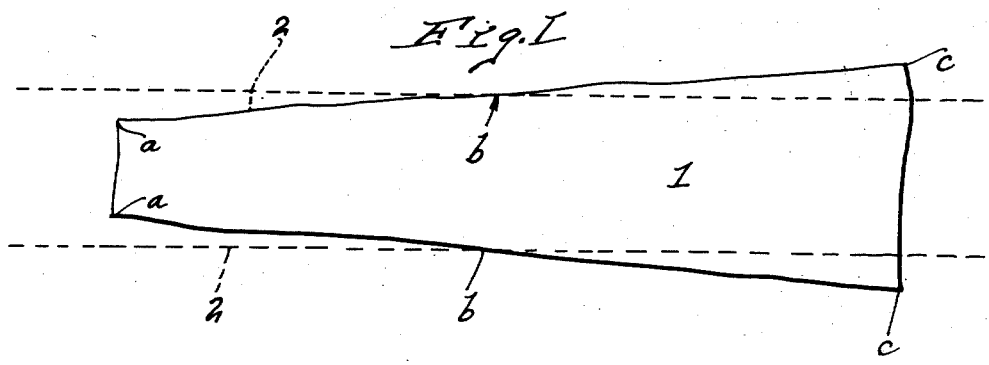
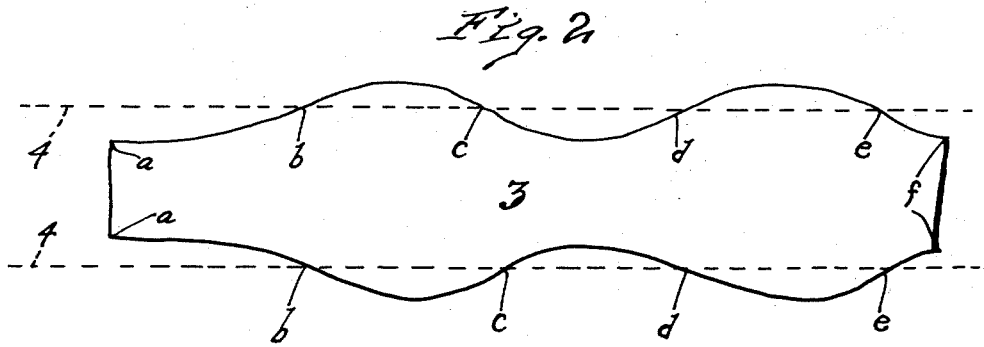
Inventors
Bernard Joseph Mumm
Bernard John Mumm
By their Attorneys Patented Jan. 15, 1929.

1,699,076

UNITED STATES PATENT OFFICE.

BERNARD JOSEPH MUMM AND BERNARD JOHN MUMM, OF ST. PAUL, MINNESOTA; SAID BERNARD JOHN MUMM ASSIGNOR TO SAID BERNARD JOSEPH MUMM.

SAUSAGE CASING AND PROCESS OF PRODUCING THE SAME.

Application filed October 15, 1927. Serial No. 226,380.

This invention relates particularly to the art of preparing sausage casings and the like from animal intestines, and the invention consists in the process and the product produced thereby. The invention is capable of use in making casings of various sizes or diameters either of true tubular or cylindrical form, straight, slightly tapered, or curved, but of a predetermined character free from irregularities such as contracted and bulged portions. In accordance with this invention, certain kinds of intestines may be given their desired form and size by lateral expansion and by either a drying or curing operation, or both, while on the former. Some kinds of intestines, however, vary so much in diameter that it is impracticable to give the desired form thereto solely by lateral expansion, and in such instances the desired result may be accomplished in a highly satisfactory manner by expanding to a predetermined diameter certain of the smaller portions of the intestines and by shrinking or contracting to the desired diameter the larger portions of the intestines. As above indicated, the intestine, after it has been given the desired form, should be given permanent character while still held in shape by the former. The air drying process will accomplish this result and also a curing process, such as produced by smoking, acids or gases, will effect the same result. In fact, the action of air will produce a sort of curing action but a more complete curing action may be produced after the intestine has been removed from the former, providing the intestine has been given the permanent character while on the former.

In the accompanying drawings I have illustrated the method utilized in one instance to reduce a tapered intestine to tubular form of constant diameter, and in another instance I have illustrated a process that is used to reduce to a tubular form of constant diameter an intestine of very greatly varying cross section or diameter.

Referring first to Figure 1, the numeral 1 indicates an animal intestine that tapers from one end toward the other. In reducing such an intestine to a casing of constant diameter throughout, a suitable former will be inserted through the intestine, and by the use of such former, that portion of the intestine that is between the portion marked $a$—$b$ will be expanded or stretched to the diameter indicated by the dotted lines marked 2—2 on Fig. 1. It may be assumed that the expansion or lateral stretching to the extent above indicated is about all that the intestine will safely stand. In this case, that portion of the intestine that is between the points marked $b$—$c$ will, while the intestine is still on the former, be contracted or shrunk down to the diameter indicated by the lines 2—2, and this contraction, as stated, may be produced by immersing the intestine, while on the former, into a solution of alum, hydrochloric acid or other suitable astringent. Then, while the intestine is still on the former, it should be dried and cured, and this will preferably be accomplished by a smoking operation which, of course, involves artificial heat.

The intestine indicated at 3 in Fig. 2 is, as stated, of varying diameter and in this instance the former should be inserted through the casing, thereby stretching to the diameter indicated by dotted lines 4—4 those portions of the intestine that are between the points $a$—$b$, that are between the points $c$—$d$ and that are between the points $d$—$f$. Here again it will be assumed that the intestine 3 can be safely stretched or laterally expanded only substantially to the diameter indicated by the dotted lines 4—4 and that the portions between the points $b$—$c$ and between the points $d$—$e$ should be shrunk down to the said constant diameter indicated by the dotted lines 4—4 by the use of an astringent or other suitable means.

In some instances the contracting operation may be produced by the action of hot air or by the action of hot air containing an astringent vapor. In this latter illustration, Fig. 2, the intestine, after having been converted to the constant diameter indicated by the lines 4—4, should also be cured, and preferably smoked, thereby giving the same a permanent constant diameter.

By reference again to Fig. 1 it will be noted that if the intestine was such as for example represented between the points $a$—$b$, then the intestine will be given its desired form solely by the action of lateral expansion or stretching. Such lateral expansion or stretching would, of course, tend to slightly shorten the casing.

By the process above described, animal intestines that have very considerable curves, such as beef bung gut, can be straightened out, but to maintain the same very greatly changed or straightened position will sometimes require the application of straight strips of casing, such as strips of beef round, applied to the sides thereof either by their own natural adhesive qualities or by the use of suitable glue such as gelatin or casein. It is important here to note that in the straightening of longitudinally curved animal intestines such as just noted, the inner side of the curve will be longitudinally stretched while the outer side of the curve will be longitudinally contracted. Here the stretching and contraction is longitudinally of the casing rather than transversely thereof.

As another feature of the invention, we propose to make laminated casings, and this may be accomplished by telescoping one casing into another, the inner casing being preferably a smaller casing than the outer casing. Two casings thus telescoped may then be shaped to a constant diameter by the process above generally outlined.

In forming the laminated casing as above described, or in securing strips to the sides of the casings as stated above the adhesion between the members can be best produced in the process of curing.

Instead of making the casings of constant diameter they may be more or less tapered if desired or may be otherwise varied, but will be uniformly brought to predetermined desired shape and will be free from irregular bulges or contractions.

By smoking the casings while they are on a form and held open, the smoke adheres to the inside as well as to the outside, and this makes it feasible in many instances to fill the casings with unsmoked meat and renders it unnecessary to smoke the sausage casing after it is filled, because the smoke adhering to the interior of the casing will give the contents thereof a smoked taste and quality. Moreover, smoking sets the adhesive, whether that of the casing itself or an added adhesive, and this is important where the casings are laminated structures.

What we claim is:

1. The process of producing an animal casing of predetermined definite form, which consists in taking an animal intestine of irregular diameter, stretching or expanding the smaller portions of said intestine, and in contracting or shrinking the larger portions of said intestine and thereafter treating the casing to permanently fix the contracted and expanded portions.

2. The process of producing animal casings of substantially constant diameter, which consists in taking animal intestines of irregular diameter, laterally stretching and expanding the smaller portions of said intestines to a predetermined diameter less than the maximum diameter of said intestines, in contracting or shrinking the larger portions of said intestines to the predetermined diameter, and in treating the intestines while held in its predetermined changed diameter, so as to give permanent set thereto.

3. The process of producing animal casings of predetermined definite form, which consists in taking an animal intestine of irregular diameter, laterally stretching or expanding the smaller portions of said intestine, in contracting or shrinking the larger portions of said intestine, and in thereafter treating the intestine to give permanent set thereto.

4. As a new article of manufacture, an animal casing of predetermined form varying from the original form of the intestines from which it is formed, said casing having some of its parts displaced by a lateral expansion or stretching and other portions reduced in diameter by contraction, the said casing being treated to give the same permanent character.

5. The process of producing laminated animal casings, which consists in taking a plurality of layers of animal intestines or membrane and adhesively and permanently securing the entire contacting surfaces of the same together.

6. The process of producing laminated animal casings, which consists in taking a plurality of layers of animal intestines or membrane and adhesively and permanently securing the entire contacting surfaces of the same together, and in thereafter curing the same.

7. As a new article of manufacture, a laminated animal casing made up of a plurality of layers of animal intestines or membrane having their entire surfaces in contact and merged together and cured.

8. As a new article of manufacture, a laminated animal casing made up of a plurality of layers of animal intestines or membrane having their entire surfaces in contact and merged together.

9. As a new article of manufacture, an animal casing comprising a precured tanned animal intestine completely smoked on its inner and outer surfaces.

10. As a new article of manufacture, a multi-ply animal casing comprising precured, tanned and permanently united layers of animal intestine.

11. The process of producing sausage casings, which consists in placing the casing on a former, drying the casing while on the former to give the desired set from thereto, and thereafter tanning the casing on its interior and exterior surfaces to give the same permanent form.

12. The process of producing a seamless multi-ply animal casing of predetermined form, which consists in superimposing two or more layers of animal intestines, stretching or expanding the multi-ply casing thus assembled, and tanning the same while in its predetermined changed form so as to cause the plies to permanently adhere and to give permanent set to the casing.

13. The process of producing animal casing of predetermined definite form, which consists in taking an animal intestine of irregular diameter, superimposing other layers of animal intestine thereon while in a tacky condition, stretching and contracting irregular portions of the multi-ply casing thus assembled to predetermined definite form, and tanning the same while held in its predetermined changed form so as to cause the plies to permanently adhere and to give permanent set to the casing.

14. The process of producing straight line sausage casings from naturally curved animal intestines, which consists in placing the casing on a former to give definite form thereto, superimposing a strip of animal intestines longitudinally on the casing, and thereafter treating the casing to cause the plies of intestines to permanently adhere and merge.

In testimony whereof we affix our signatures.

BERNARD JOSEPH MUMM.
BERNARD JOHN MUMM.